United States Patent
Dong

(10) Patent No.: US 8,194,405 B2
(45) Date of Patent: Jun. 5, 2012

(54) ACCESSORY STRAP SECURING MECHANISM

(75) Inventor: Shui-Jin Dong, Shenzhen (CN)

(73) Assignees: Shenzhen Futaihong Precision Industry Co., Ltd., ShenZhen, Guangdong Province (CN); FIH (Hong Kong) Limited, Kowloon (HK)

(*) Notice: Subject to any disclaimer, the term of this patent is extended or adjusted under 35 U.S.C. 154(b) by 298 days.

(21) Appl. No.: 12/610,503

(22) Filed: Nov. 2, 2009

(65) Prior Publication Data

US 2010/0328857 A1 Dec. 30, 2010

(30) Foreign Application Priority Data

Jun. 29, 2009 (CN) .......................... 2009 1 0303824

(51) Int. Cl.
*H05K 5/00* (2006.01)
*G06F 1/16* (2006.01)
(52) U.S. Cl. ......... 361/679.58; 361/679.01; 361/679.02; 361/679.3; 361/679.55; 361/679.56; 361/679.57; 248/317; 248/339; 224/930; 224/255; 292/80; 292/84; 292/87
(58) Field of Classification Search ............. 361/679.01, 361/670.02, 679.3–679.58; 248/317, 339; 224/930, 255; 292/80, 84, 87
See application file for complete search history.

(56) References Cited

U.S. PATENT DOCUMENTS

| | | | |
|---|---|---|---|
| 3,710,391 A * | 1/1973 | McGlynn | 2/460 |
| 2002/0080560 A1* | 6/2002 | Flegeo | 361/600 |
| 2005/0205625 A1* | 9/2005 | House | 224/269 |
| 2006/0058080 A1* | 3/2006 | Chen | 455/575.6 |
| 2006/0179783 A1* | 8/2006 | Hay et al. | 52/698 |
| 2006/0283898 A1* | 12/2006 | Tages | 224/269 |
| 2007/0297130 A1* | 12/2007 | Fan et al. | 361/686 |
| 2008/0318646 A1* | 12/2008 | Lin | 455/575.4 |
| 2009/0086440 A1* | 4/2009 | Takahama | 361/724 |
| 2009/0185071 A1* | 7/2009 | Suzuki et al. | 348/375 |
| 2010/0102576 A1* | 4/2010 | Zhang | 292/261 |
| 2010/0165554 A1* | 7/2010 | Dong et al. | 361/679.01 |

* cited by examiner

*Primary Examiner* — Hung S Bui
*Assistant Examiner* — James Wu
(74) *Attorney, Agent, or Firm* — Altis Law Group, Inc.

(57) ABSTRACT

An accessory strap securing mechanism is positioned in a portable electronic device to assemble an accessory strap thereon. The portable electronic device defines an assembling slot. The accessory strap securing mechanism includes an assembling portion and a securing member. The assembling portion is formed in the portable electronic device. The securing member includes a fixing portion and a holding portion. The fixing portion is fixed to the assembling portion. The holding portion includes a clasp, and the clasp is deformed to allow the accessory strap to separate when a force applied to the accessory strap exceeds a predetermined amount.

7 Claims, 4 Drawing Sheets

ACCESSORY STRAP SECURING MECHANISM

BACKGROUND

1. Technical Field

The present disclosure relates to an accessory strap securing mechanism for a portable electronic device.

2. Description of Related Art

With the development of technologies, portable electronic devices such as mobile phones, MP3s, digital cameras and personal digital assistants (PDAs) are now widely used, and consumers may now enjoy the full convenience of high technology products almost anytime and anywhere.

Conventional portable electronic devices usually have an accessory strap securing mechanism disposed thereon for attachment of a carrying strap. However, the small size of existing accessory strap securing mechanisms makes it difficult for the strap to be connected and release the strap when the strap is subjected to abnormally large tensile forces.

Therefore, there is room for improvement within the art.

BRIEF DESCRIPTION OF THE DRAWING

Many aspects of the present accessory strap securing mechanism for an electronic device can be better understood with reference to the following drawings. The components in the various drawings are not necessarily drawn to scale, the emphasis instead being placed upon clearly illustrating the principles of the present accessory strap securing mechanism in electronic device. Moreover, in the drawings, like reference numerals designate corresponding parts throughout the diagrams.

DETAILED DESCRIPTION

Figure 1:
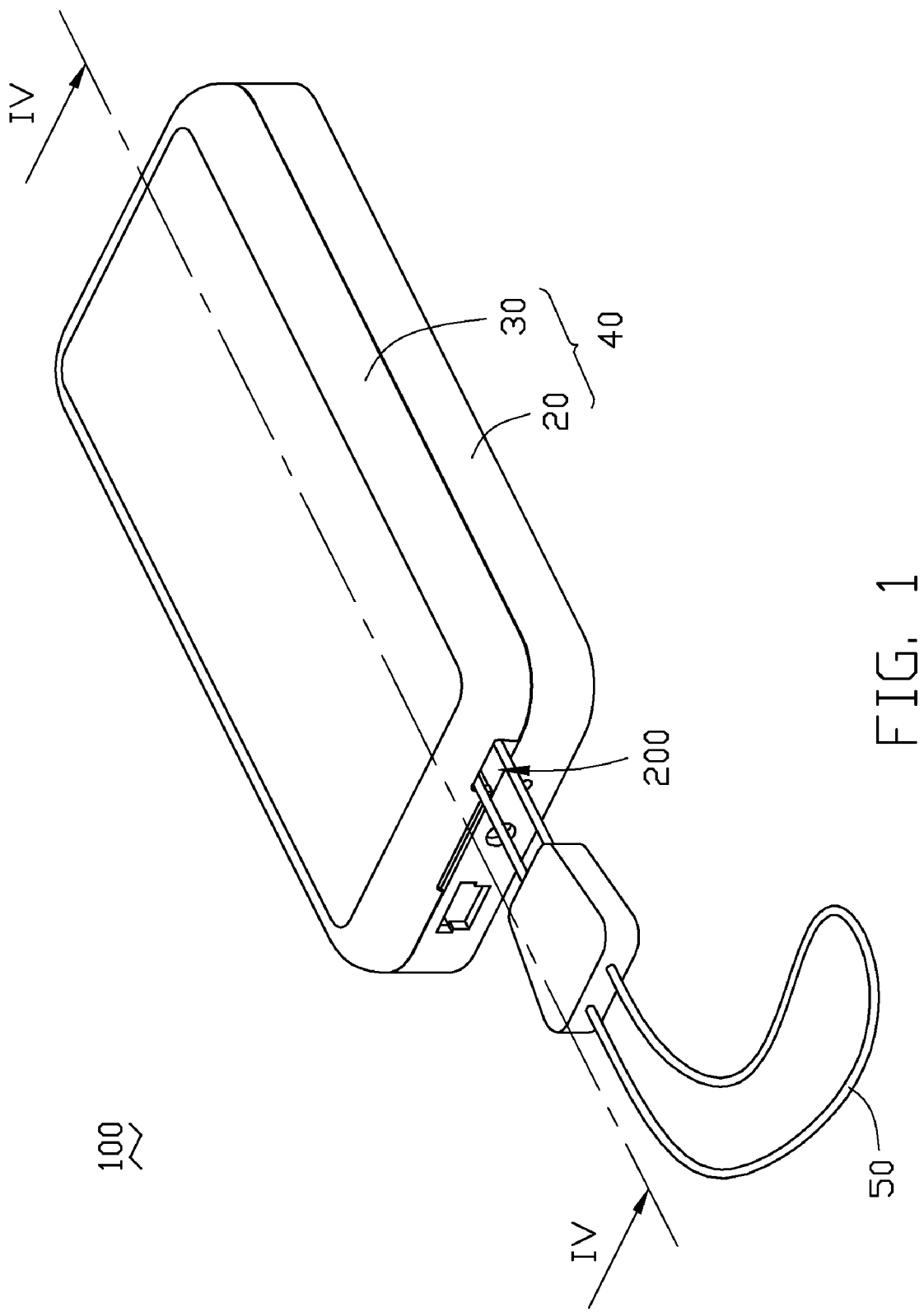
FIG. 1 shows an isometric view of a portable electronic device having an accessory strap assembled therewith in accordance with an exemplary embodiment.
Figure 2:
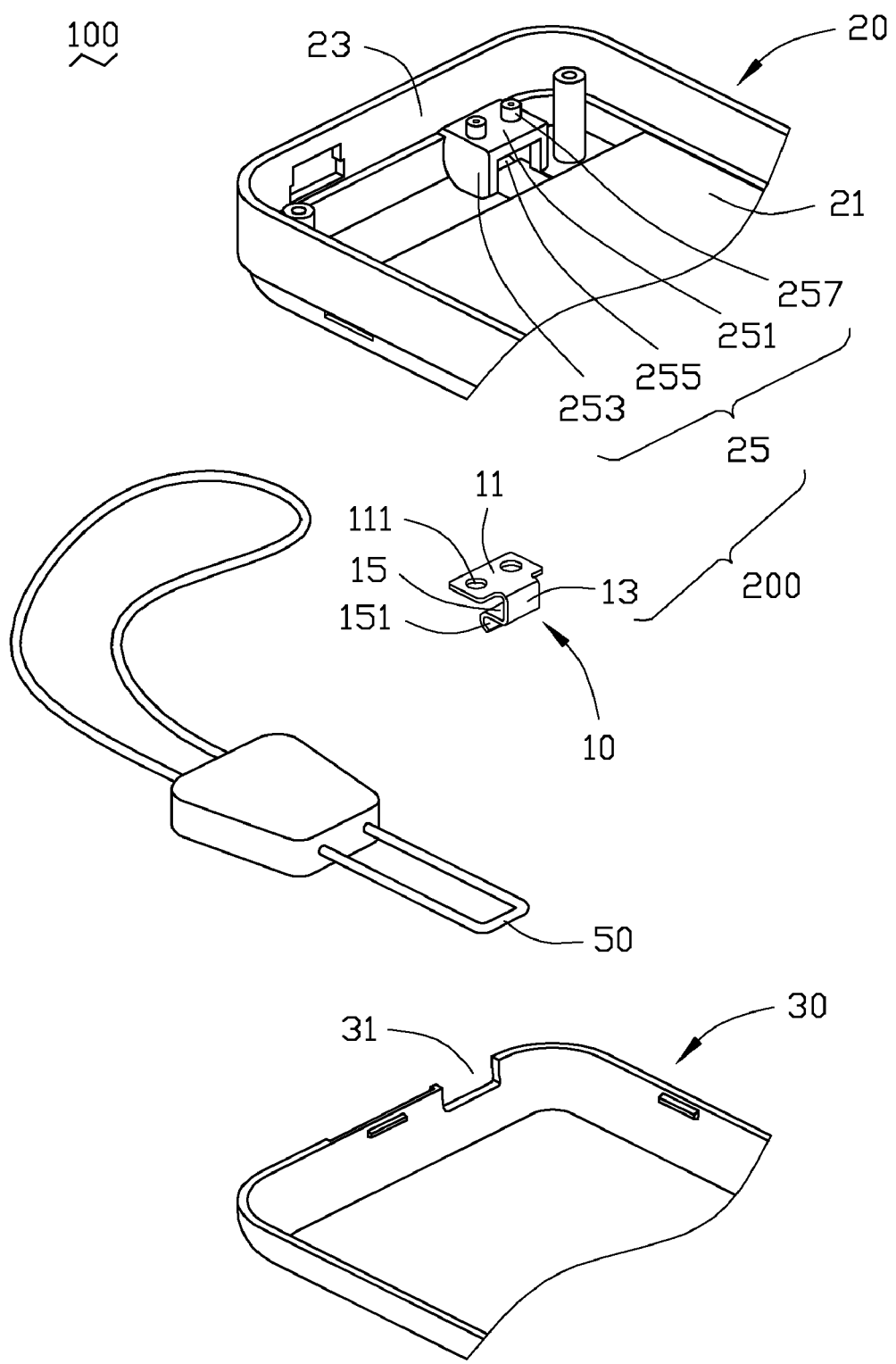
FIG. 2 is an exploded, isometric view of a portable electronic device shown in FIG. 1.

Referring to FIGS. 1 and 2, a portable electronic device 100 includes a main body 40 and an accessory strap securing mechanism 200 disposed therein to assemble an accessory strap 50 thereto. The main body 40 may be a mobile phone, an MP3, a digital camera or a personal digital assistant (PDA), etc. The accessory strap securing mechanism 200 includes a securing member 10 and an assembling portion 25.

Figure 3:
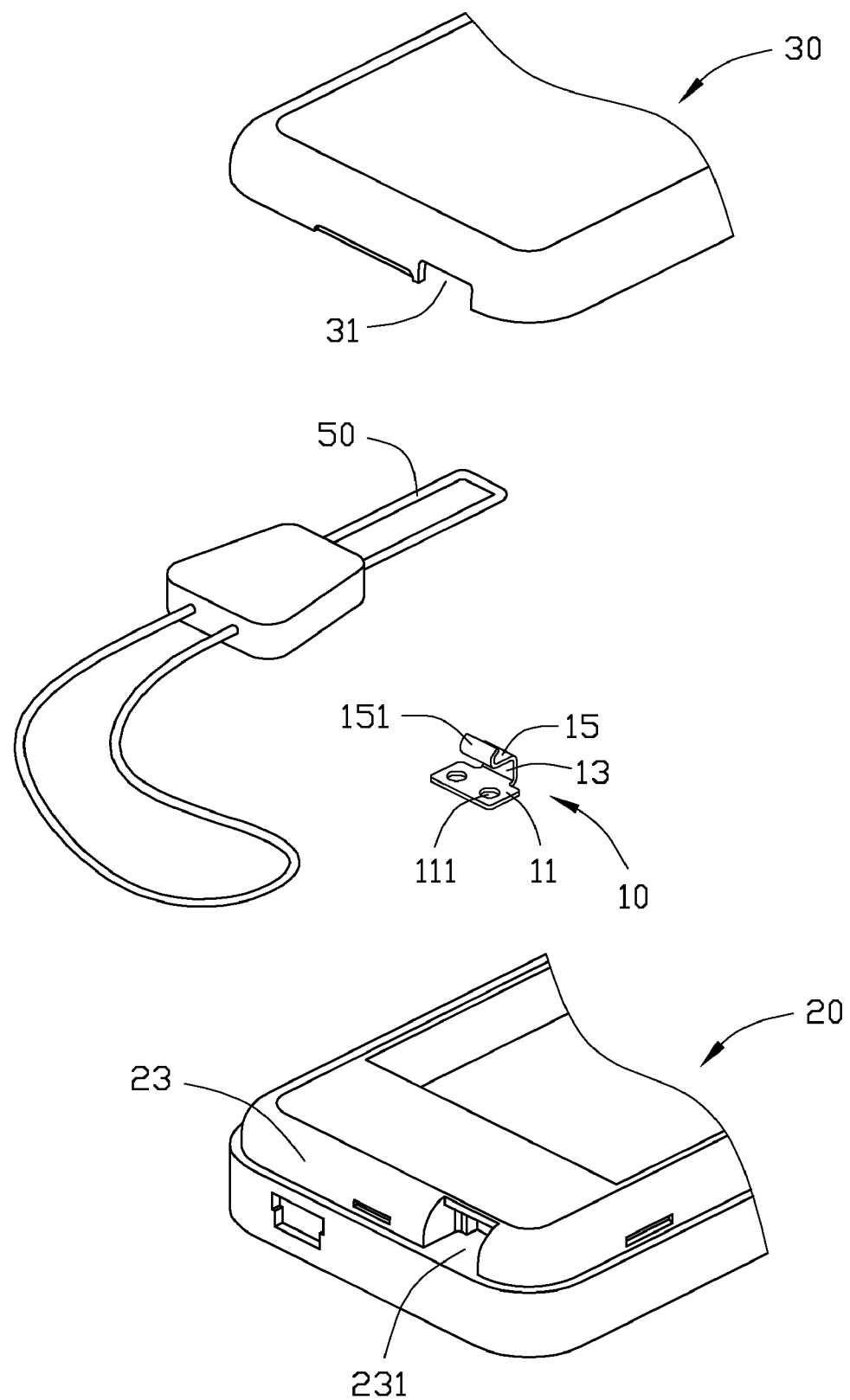
FIG. 3 is similar to FIG. 2, but from another aspect.

The main body 40 includes a housing member 20 and a cover member 30. The housing member 20 includes a main body 23 with a bottom portion 21. The assembling portion 25 is formed on the bottom portion 21. The assembling portion 25 includes a support plate 251 and two side plates 253. One end of the side plates 253 are integrally formed to the bottom portion 21. The other end of the side plates 253 are connected to the support plate 251. The side plates 253 and the support plate 251 cooperatively define a receiving cavity 255. Two spaced posts 257 are formed on the support plate 251. Referring to FIG. 3, the other side of the main body 23 defines an assembling slot 231 opposite to the bottom portion 21. The assembling slot 231 is in communication with the receiving cavity 255. The cover member 30 defines a notch 31 at one end thereof. When the cover member 30 is attached to the housing member 20, the notch 31 is engagable with the assembling slot 231 to define an opening space allowing entry of the accessory strap 50.

The securing member 10 is attached to the assembling portion 25. The securing member 10 can be made of metal, and includes a fixing portion 11, a holding portion 15, and a connecting portion 13. The fixing portion 11 defines two holes 111 for receiving the posts 257 to fix the securing member 10 to the housing member 20. The connecting portion 13 vertically extends from one side of the fixing portion 11. The holding portion 15 perpendicularly extends from the connecting portion 13, and a distal end of the holding portion 15 is bent to form a clasp 151. Material such as metal can be chosen for the securing member 10 according to its tensile strength. In this embodiment, material is chosen for the clasp 151 to endure up to a tensile force of about 100 Newton. When a force greater than 100 Newton is applied, the clasp 151 should deform to allow the accessory strap 50 to separate from clasp 151.

Figure 4:
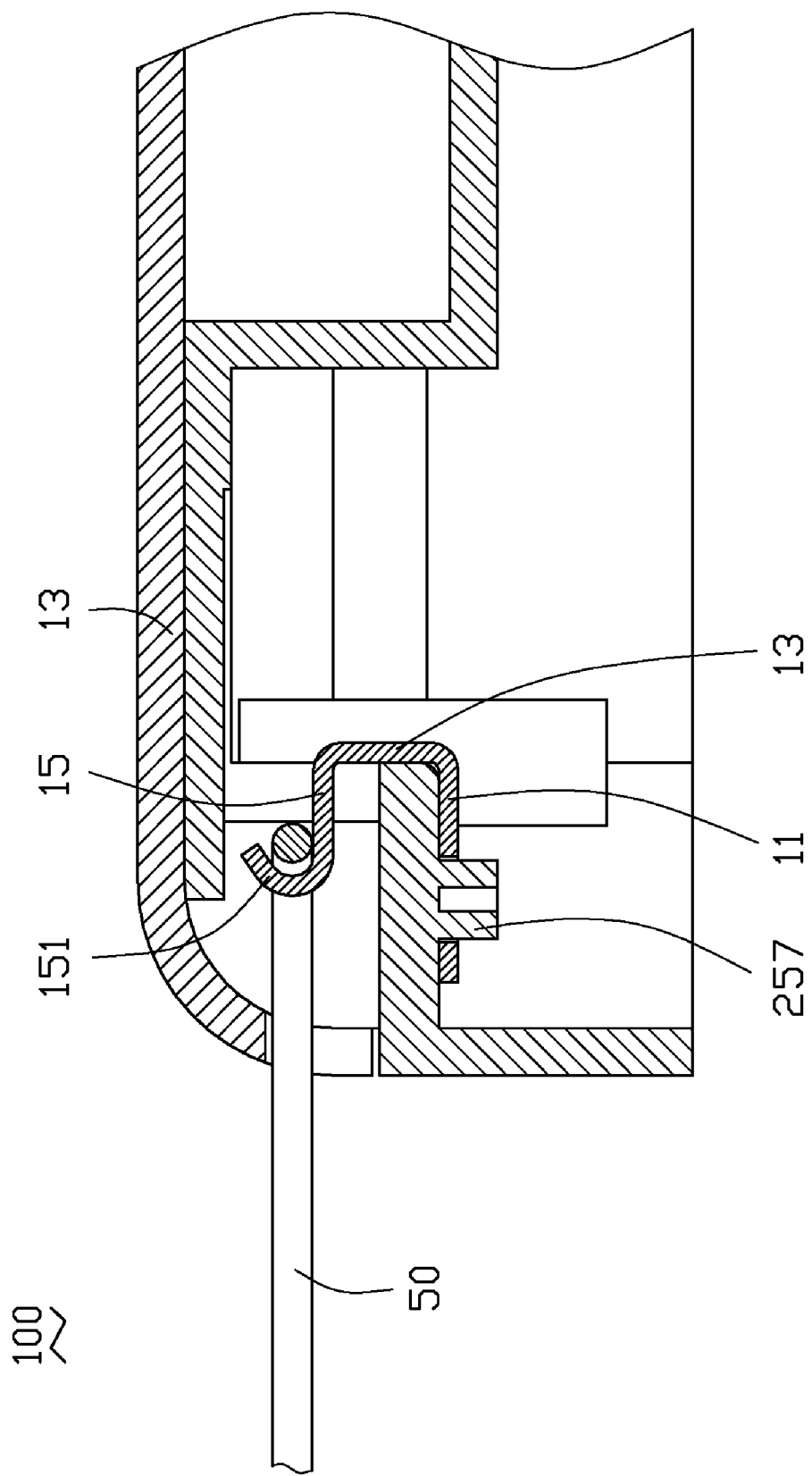
FIG. 4 is a partial cross sectional view of FIG. 1 taken along IV-IV.

Referring to FIG. 4, during assembly of the accessory strap securing mechanism 200, firstly, the securing member 10 is attached to the assembling portion 25. The two posts 257 are respectively received in the holes 111 of the securing member 11. The connecting portion 13 is abutted against the two side plates 253. The clasp 151 of the holding portion 15 is received in the receiving cavity 255. Then, the posts 257 are melted and pressed by a device so as to fix the securing member 10 to the assembling portion 25. The accessory strap 50 enters from the assembling slot 231, and is placed around the claps 151. Accordingly, the accessory strap 50 is attached to the portable electronic device 100. Since the clasp 151 may be deformed, the clasp 151 can allow the accessory strap 50 to break away from the portable electronic device 100 when the clasp 151 endures an abnormally large force. In addition, it is easy to operate and assemble the accessory strap 50 quickly and conveniently.

It is to be understood that the securing member fixed to the assembling portion may adopt other ways besides hot melting.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An accessory strap securing mechanism positioned on a portable electronic device to assemble an accessory strap thereon, the portable electronic device defining an assembling slot, the accessory strap securing mechanism comprising:

an assembling portion formed in the portable electronic device;

a securing member including a fixing portion, a connecting portion and a holding portion, the fixing portion being fixed to the assembling portion, the connecting portion vertically extending from one side of the fixing portion, the holding portion perpendicularly extending from the connecting portion and the holding portion including a clasp formed at a distal end thereof, the clasp being deformed to allow the accessory strap to separate from the strap securing mechanism when a force applied to the strap exceeds a predetermined amount, wherein the assembling portion includes a support plate and two parallel side plates, one end of the side plates are integrally formed on a main body, the other end of the side plates are connected to two sides of the support plate, the side plates and the support plate cooperatively define a receiving cavity, the fixing portion abutting against the support plate, and the connecting portion abutting against the side plates, and only the holding portion is received in the receiving cavity.

2. The accessory strap securing mechanism as claimed in claim 1, wherein the fixing portion of the securing member is fixed to the assembling portion by hot melting, and the distal end of the holding portion is reversely bent to form the clasp relative to the fixing portion.

3. The accessory securing mechanism as claimed in claim 1, wherein the clasp can endure a tensile force of 100 Newton before deforming.

4. The accessory securing mechanism as claimed in claim 1, wherein two spaced posts are formed on the support plate, and the fixing portion defines two holes for receiving the posts.

5. A portable electronic device comprising:
   a main body; and
   an accessory strap securing mechanism disposed on the main body to assemble a accessory strap; the accessory strap securing mechanism comprising:
   an assembling portion formed in the main body;
   a securing member including a fixing portion, a connecting portion and a holding portion, the fixing portion being fixed to the assembling portion, the connecting portion vertically extending from one side of the fixing portion, the holding portion perpendicularly extending from the connecting portion and the holding portion including a clasp formed at a distal end thereof, the clasp being deformable to allow the accessory strap to separate from the clasp when a force applied to the accessory strap exceeds a predetermined amount, wherein the assembling portion includes a support plate and two parallel side plates, one end of the side plates are integrally formed on the main body, the other end of the side plates are connected to two sides of the support plate, the side plates and the support plate cooperatively define a receiving cavity, the fixing portion abutting against the support plate, and the connecting portion abutting against the side plates, and only the holding portion is received in the receiving cavity.

6. The portable electronic device as claimed in claim 5, wherein the clasp can endure a tensile force of 100 Newton before deforming.

7. The portable electronic device as claimed in claim 5, wherein the distal end of the holding portion is reversely bent to form the clasp relative to the fixing portion.

* * * * *